(12) United States Patent
Horner et al.

(10) Patent No.: US 11,874,673 B2
(45) Date of Patent: Jan. 16, 2024

(54) INTEGRATED TRAVEL CONTROL AND ATTITUDE HEADING REFERENCE SYSTEM

(71) Applicant: Honeywell International Inc., Morris Plains, NJ (US)

(72) Inventors: Adam Ross Horner, Elk River, MN (US); Neil Manning, Phoenix, AZ (US); John Koenig, Scottsdale, AZ (US); Wayne Schultz, Robbinsdale, MN (US); Timothy Brown, Maple Grove, MN (US)

(73) Assignee: Honeywell International Inc., Charlotte, NC (US)

( * ) Notice: Subject to any disclaimer, the term of this patent is extended or adjusted under 35 U.S.C. 154(b) by 630 days.

(21) Appl. No.: 16/830,610

(22) Filed: Mar. 26, 2020

(65) Prior Publication Data
US 2021/0232161 A1    Jul. 29, 2021

Related U.S. Application Data

(60) Provisional application No. 62/966,379, filed on Jan. 27, 2020.

(51) Int. Cl.
G05D 1/10 (2006.01)
B64C 39/02 (2023.01)
B64U 101/60 (2023.01)

(52) U.S. Cl.
CPC .......... G05D 1/101 (2013.01); B64C 39/024 (2013.01); *B64U 2101/60* (2023.01); *B64U 2201/10* (2023.01)

(58) Field of Classification Search
CPC .... G05D 1/101; G05D 1/0055; B64C 39/024; B64C 2201/128; B64C 2201/141;
(Continued)

(56) References Cited

U.S. PATENT DOCUMENTS 6,205,400 B1* 3/2001 Lin .................. G01S 19/49
701/472
2005/0150289 A1* 7/2005 Osborne .............. G01C 21/166
73/178 R
(Continued)

FOREIGN PATENT DOCUMENTS

CN          108919819 A    11/2018
EP            3594923 A1     1/2020
WO      2015168320 A1    11/2015

OTHER PUBLICATIONS

European Patent Office, "Extended European Search Report from EP Application No. 21151463.3", from Foreign Counterpart to U.S. Appl. No. 16/830,610, dated Jun. 18, 2021, pp. 1 through 9, Published: EP.

(Continued)

*Primary Examiner* — Anne Marie Antonucci
*Assistant Examiner* — Jared C Bean
(74) *Attorney, Agent, or Firm* — Fogg & Powers LLC

(57) ABSTRACT

Techniques for integrating a travel control system and attitude and heading (AHR) system in a vehicle are disclosed. The integrated system includes interface circuitry that enables data communication between constituent travel control system and AHR system of the integrated system, and can further communicate data between the travel control system and/or the AHR system and other system(s) or device(s) in or on the vehicle. In some embodiments, the travel control system includes processing circuitry that is fault tolerant. Alternatively, or additionally, the AHR system may include processing circuitry that has a processing power greater than the travel control system processing circuitry.

20 Claims, 2 Drawing Sheets

(58) Field of Classification Search
CPC .. G01C 21/20; G01C 21/165; B64U 2101/60;
B64U 2201/10
See application file for complete search history.

(56) References Cited

U.S. PATENT DOCUMENTS

2018/0107228 A1    4/2018  Williams
2019/0339718 A1*  11/2019  Koch ................... G08G 5/045

OTHER PUBLICATIONS

"Athena 611 Integrated Flight Control System", Attitude and Heading Reference System (AHRS), at least as early as Jan. 30, 2020, pp. 1-7.
"Honeywell Product Placards—Uber Elevate Conference", Uber Elevate Conference 2019, Jul. 11, 2019, pp. 1-8, Washington D.C.
"Honeywell Uber Elevate Conference Product Overview", [compressed] Uber Elevate Conference 2019, Jul. 11, 2019, pp. 1-10, Washington D.C.
"Honeywell Uber Elevate Conference Product Overview", Uber Elevate Conference 2019, Jul. 11, 2019, pp. 1-11, Washington D.C.
Honeywell, "Compact Fly-By-Wire", Products—Cockpit Systems and Displays, Jun. 2019, pp. 1-2.
Kress, "Honeywell Unveils Compact Fly-By-Wire System for Urban Air Vehicles", Press Releases, Jun. 1, 2019, pp. 1-3, Honeywell.
European Patent Office, "Communication pursuant to Article 94(3)", from EP Application No. 21151463.3, from Foreign Counterpart to U.S. Appl. No. 16/830,610, dated Mar. 23, 2023, pp. 1 through 5, Published: EP.

* cited by examiner

INTEGRATED TRAVEL CONTROL AND ATTITUDE HEADING REFERENCE SYSTEM

CROSS REFERENCE TO RELATED APPLICATIONS

The present application claims priority to U.S. Provisional Application Ser. No. 62/966,379 filed Jan. 27, 2020, titled "INTEGRATED TRAVEL CONTROL AND ATTITUDE HEADING REFERENCE SYSTEM", the entire contents of which are incorporated herein by reference as if set forth in their entirety.

BACKGROUND

Urban air mobility (UAM) vehicles means airborne vehicles expected to provide supplemental sources of transportation in cities and urban environments to permit transport of passengers and cargo to avoid and alleviate road congestion. Like other airborne vehicles, such as commercial jet aircraft used by airlines, UAM vehicles require flight control and attitude and heading information.

For the larger airborne vehicles, provision of flight control and attitude and heading information is independently implemented by discrete systems, each of which has its own electronics interface and power supply. Because an UAM vehicle size and propulsion power is smaller in comparison to such larger airborne vehicles, the discrete systems used in the larger airborne vehicles can be too large and heavy to be used in an UAM vehicle. Further, the discrete system may consume more electrical power than can be supplied by the UAM vehicle.

SUMMARY

In one embodiment, a system is provided. The system comprises first processing circuitry configured to determine the attitude and heading data of a vehicle using inertial data. The system also comprises second processing circuitry configured to control at least one component of the vehicle using attitude and heading data and at least one command signal, wherein the at least one component is configured to alter a velocity of the vehicle. The system further comprises interface circuitry communicatively coupled between the first processing circuitry and the second processing circuitry, wherein the interface circuitry is configured to receive the inertial data, to provide the inertial data to the first processing circuitry, and to provide the attitude and heading data to the second processing circuitry, and wherein the interface circuitry comprises an interface to at least one of (a) at least one bus and (b) at least one network shared by the first processing circuitry and the second processing circuitry.

BRIEF DESCRIPTION OF THE DRAWINGS

Exemplary features of the present disclosure, its nature, and various advantages will be apparent from the accompanying drawings and the following detailed description of various embodiments. Non-limiting and non-exhaustive embodiments are described with reference to the accompanying drawings, wherein like labels or reference numbers refer to like parts throughout the various views unless otherwise specified. The sizes and relative positions of elements in the drawings are not necessarily drawn to scale. For example, the shapes of various elements are selected, enlarged, and positioned to improve drawing legibility. The particular shapes of the elements as drawn have been selected for ease of recognition in the drawings. One or more embodiments are described hereinafter with reference to the accompanying drawings in which.

DETAILED DESCRIPTION

Figure 1:
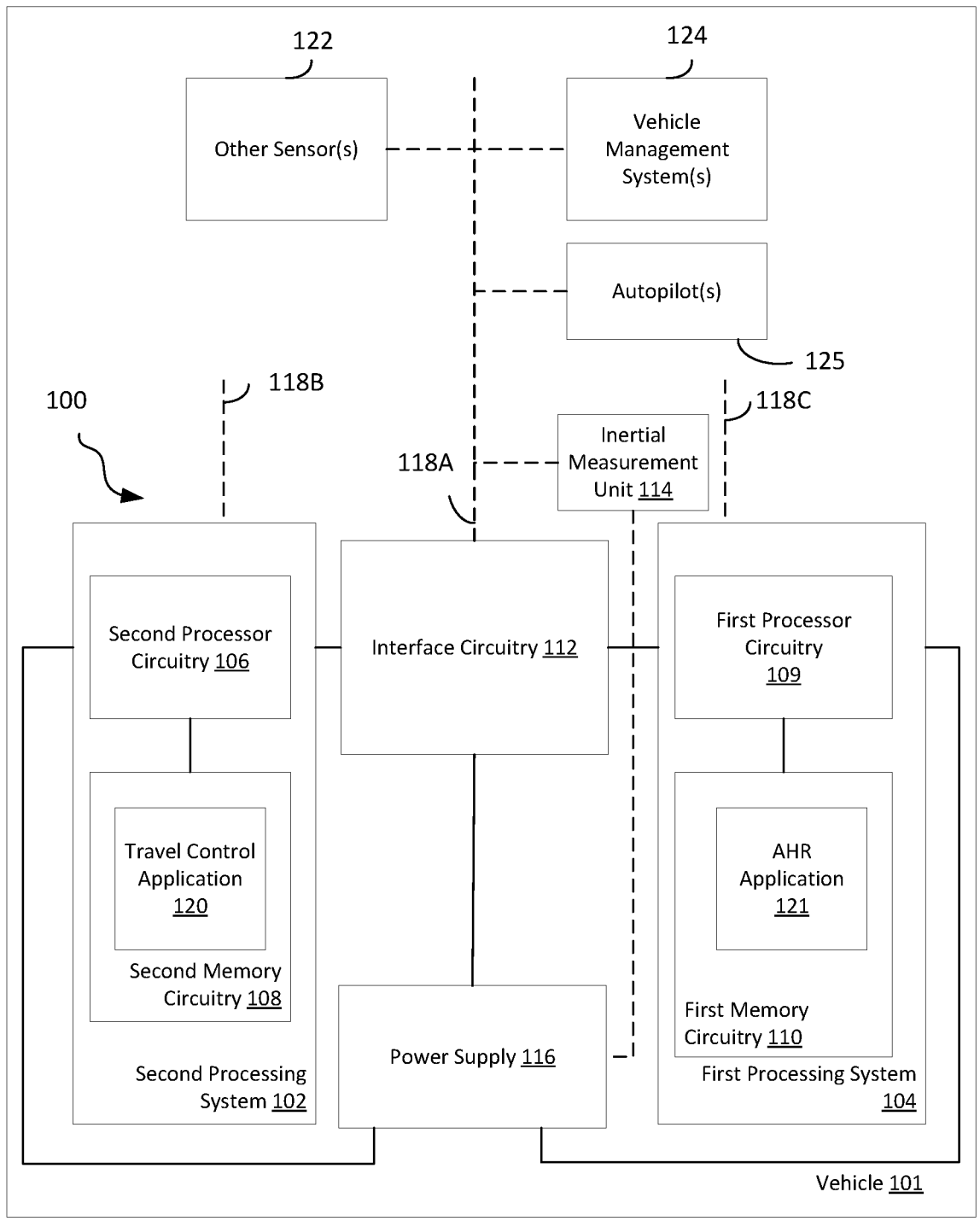
FIG. 1 illustrates a block diagram of one embodiment of an integrated travel control and attitude and heading reference system.

In the following detailed description, reference is made to the accompanying drawings that form a part hereof, and in which is shown by way of illustration specific illustrative embodiments. However, it is to be understood that other embodiments may be utilized, and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

Techniques relating to integrating a travel control system and an attitude and heading reference system are subsequently described. The integrated travel control and the attitude and heading reference system (or integrated system) results in reduced size, weight, power, and cost (SWaP-C). The integrated system includes separate processing circuitry to perform travel control, and attitude and heading determination. Attitude and heading reference functionality determines pitch, roll, yaw, and heading of a vehicle, or an equivalent in any three-dimensional coordinate system.

Travel control means controlling at least one component of a vehicle, where each component is configured to alter vehicle velocity (i.e., vehicle speed and/or vehicle heading). Input for travel control may be received from crew of the vehicle and/or control system(s) (e.g., analog or digital computer and/or neural network circuitry) onboard and/or offboard the vehicle. Input for travel control may additionally or alternatively be from crew through control mechanism(s) such as a stick or a yoke, and/or actuators such as pedal(s), lever(s), switch(es), and any other type(s) of actuators. Such control system(s) may include one or more autopilots and/or one or more vehicle control system(s).

The input typically alters the velocity of the vehicle. Optionally, such components of the vehicle may include propulsion system(s) of a vehicle (e.g., motor(s), jet engine(s), rocket(s), and/or any other propulsion system(s)). Such components may also include other components, e.g., wheel steering system(s), wheel and/or air braking system(s), systems for controlling the tilt of rotating blade(s), jet engine(s), and/or rocket(s), rudder(s), aileron(s), flap(s), and/or any other components configured to alter the alter the velocity of the vehicle. Flight control means travel control for airborne or space borne vehicles. Input for travel control may be also be received from one or more sensors, e.g., an inertial measurement unit, and one or more other sensors (subsequently described) including without limitation one or more global navigation satellite system receivers.

For pedagogical purposes, embodiments of the invention will be subsequently illustrated for an UAM vehicle, utilizing flight control and corresponding components. However, the invention is applicable for other types of vehicle, including spacecraft, commercial aircraft, and/or any other type of vehicle. Also, for pedagogical reasons, the term flight may be more generally referred to as travel, including with respect to a variety of vehicle terminology.

The processing circuitry for travel control and attitude and heading determination are separated because processing circuitry for travel control may require fault tolerance and processing circuitry for attitude and heading determination may require more processing power than the processing circuitry for travel control. Travel control may require fault tolerance to diminish errors in travel control which can lead to harm to the vehicle, cargo, and/or passengers. Attitude and heading determination may require more processing power because complex equations must be solved substantially in real time to provide timely and accurate attitude and heading data. Accurate attitude and heading information are needed to facilitate travel control.

Because travel control and attitude and heading functionality are integrated, the separate processing circuitry for travel control and attitude and heading determination are implemented with common input and output (I/O) interface provided by interface circuitry, and optionally with only one power supply to power both processing circuitry and the interface circuitry; however, two or more power supplies can be alternatively used. The common I/O interface reduces the amount of cabling required on an UAM vehicle, and thus improves the integrated system's SWaP-C. The optional use of only one power supply increases power efficiency, and reduces the number of power supplies, and thus also improves the integrated system's SWaP-C.

Vehicle inertial and/or position data is required to determine vehicle attitude and heading. Optionally, vehicle inertial data may be provided by one or more inertial measurement units (IMU). Although a single IMU is illustrated herein for pedagogical purposes, more than one IMU may be used. Vehicle position data means the three-dimensional position of a vehicle with respect to an object, e.g. the earth. Optionally, vehicle position data may be provided by at least one global navigation satellite system (GNSS) receiver (GNSS receiver(s)). The IMU comprises at least one accelerometer and at least one gyroscope. Optionally, the IMU may comprise one or more magnetometer(s). The GNSS receiver(s) may include one or more Global Positioning System (GPS) receivers, one or more Galileo receivers, one or more Beidou receivers, one or more Globalnaya Navigatsionnaya Sputnikovaya Sisterna (GLONASS) receivers, and/or one or more of any other type(s) of GNSS receivers. Optionally, the vehicle inertial data is provided from the IMU and/or vehicle position data is provided by the GNSS receiver(s) through the common I/O interface, and thus the interface circuitry, to first processing circuitry. Inertial data means data about vehicle acceleration in and rotation about at least one axis of the vehicle.

The first processing circuitry is configured to calculate attitude parameters, e.g., pitch, roll, and yaw of the vehicle, and vehicle heading. The second processing circuitry is configured to implement a travel control. The interface circuitry is further configured to communicatively couple the vehicle inertial data and/or the vehicle position data to second processing circuitry. If inertial data is provided by an IMU and position data is provided by GNSS receiver(s), then, optionally, attitude and heading may be determined from the inertial data and the position data using non-linear estimation such as a Kalman filter(s).

FIG. 1 is a block diagram of one embodiment of an integrated travel control and attitude and heading reference system (integrated system) 100. The integrated system 100 is configured to be installed in a vehicle, e.g., an UAM vehicle. The integrated system 100 includes first processing system (first processing circuitry) 104, a second processing system (second processing circuitry) 102, and interface circuitry 112. The first processing system 104 and the second processing system 102 may each comprise analog processing circuitry, a state machine, and/or a neural network.

Optionally, the integrated system 100 comprises a power supply (power supply circuitry) 116. The power supply is configured to be coupled to and provide power to the first processing system 104, the second processing system 102, the interface circuitry 112, and/or any other components of the integrated system 100.

The first processing system 104 and the second processing system 102 are coupled to the interface circuitry 112 to facilitate transmission and receipt of signals, e.g., data, from external system(s) and/or sensor(s), e.g., an IMU and/or GNSS receiver(s). Optionally, the integrated system 100 may include an inertial measurement unit 114 coupled to the interface circuitry 112. The optional IMU 114 may also be optionally coupled to the optional power supply 116.

For pedagogical purposes, the first processing system 104 and the second processing system 102 are illustrated herein as state machines. The first processing system 104 includes first processor circuitry 109 and first memory circuitry 110, which are communicatively coupled to one another. Similarly, second processing system 102 includes second processor circuitry 106 and second memory circuitry 108, which are communicatively coupled to one another. The first processing system 104 and the second processing system 102 are communicatively coupled to one another through the interface circuitry 112. The interface circuitry 112 includes a first bus interface 118A. Optionally, the first processing system 104 includes a third bus interface 118C. Optionally, the second processing system 102 includes a second bus interface 118B. Bus interface means an interface to one or more buses and/or networks, each of which bi- or uni-directionally transfers analog and/or digital signals between two or more components (e.g., between (a) at least one of: the interface circuitry 112, the first processing system 104, and the second processor system 102, and (b) circuitry and/or component(s) external to the integrated system 100; thus analog and/or digital signals may flow from (a) to (b), vice versa, or in both directions). An interface means electrical circuitry used to communicatively couple two or more devices. Signals include data and/or control signals, e.g., for and/or from actuators and/or other controlled components. Such buses and networks may comprise controller area network (CAN) bus(es), Ethernet network(s), variable differential transformer (VDT) bus, Aeronautical Radio, Inc. (ARINC) 429 compliant bus(es), strappable port(s), inter-integrated circuit (I2C) bus(es), RS-485 compliant bus(es), RS-232 compliant bus(es), and/or any other type of bus(es) and/or network(s). For example, VDT bus(es) can be used to couple control mechanism(s) to second processing system 102. For example, CAN bus(es) and/or ARINC 429 compliant bus(es) can be used to couple control systems to the second processing system 102.

The interface circuitry 112 is configured, through the first bus interface 118A, to receive and/or transmit signals, e.g., inertial data and/or position data, between the first processor system 104 (e.g., the first processor circuitry 109) and other components, e.g., the IMU, GNSS receiver(s), and/or any other component(s), e.g., other sensor(s). The first bus interface 118a comprises an interface to one or more buses and/or networks shared by the first processing system 104 and the second processing system 102. The interface circuitry 112 may be implemented by application specific integrated circuitry, programmable logic device circuitry, programmable gate array circuitry, and/or other circuitry.

The second processing system 102 is configured to implement the functions of a travel or vehicle control system. The first processor system 104 is configured to generate attitude and heading data. The interface circuitry 112 is configured to couple attitude and heading data generated by the first processing system 104, e.g., by the first processor circuitry 109, to the second processing system 102, e.g., the second processor circuitry 106, the second memory circuitry 108, and/or an optional travel control application 120. Optionally, an attitude and heading (AHR) application 121 is stored in the first memory circuitry 110, executed by the first processor circuitry 109, and is configured to generate the attitude and heading data using inertial data and/or position data. Optionally, the interface circuitry 112 is configured to couple inertial data and/or position data to the second processing system 102 from the first processing system 104, if the first processing system 104 is configured to generate attitude and heading data from inertial data and/or position data.

Optionally, the second processor circuitry 106 may be implemented with one or more fault tolerant (e.g., lock-step) processors circuits (e.g., a Texas Instruments Inc. Hercules processor). For example, the second processor circuitry 106 is configured to execute data, e.g., instructions of an optional travel control application 120 stored in the second memory circuitry 108. The second memory circuitry 108 is configured to store data generated by and/or processed (e.g., instructions of the optional travel control application 120) by the second processor circuitry 106. The optional travel control application 120 is a travel control algorithm which generates control signals configured to control components of the vehicle which alter vehicle velocity. The optional travel control application 120 optionally may receive control input signals from external control system(s) (e.g., optional one or more autopilots (autopilot(s)) 125 and/or optional one or more vehicle management systems (vehicle management system(s)) 124) and/or control(s) manipulated by flight crew). The interface circuitry 112 may be coupled to the optional vehicle management system(s) 124 and/or the autopilot(s) 125, to facilitate communicating commands from the vehicle management system(s) 124 and/or the autopilot(s) 125 to the second processing system 102, e.g. the travel control application 120.

A vehicle management system means a system used to automatically manage a travel plan of a vehicle using sensor data. For example, a travel plan (e.g., including velocit(ies) and/or waypoint(s) along a travel path from a departure location to a destination location) may be provided by another system and/or vehicle crew. For a vehicle 101 that is an airborne or space borne vehicle (e.g. an aircraft), the travel plan is known as a flight plan, the travel path is known as a flight path, the vehicle management system(s) are known as a flight management system(s), and the optional travel control application 120 is known as the flight control application.

An autopilot means a system used to keep a vehicle at a specific velocity without intervention of vehicle crew, e.g., a pilot. Optionally, the specific velocity is provided by at least one of: (a) the vehicle management system(s) 124, and (b) one or more of the vehicle crew. If the specific velocity is provided by the vehicle management system(s) 124, it is to ensure that the vehicle 101 remains on an intended travel path eventually leading to a destination location. The autopilot(s) 125 provides commands to the second processing system 102 (e.g., the travel control application 120) to cause components which adjust vehicle velocity so as to maintain the specific velocity. Commands as used in conjunction with commands provided for travel control (e.g., to the second processing system 102 (e.g., the second processor circuitry 106 and/or the travel control application 120)) means instructions of any type and format, including without limitation control signals. Commands may also be referred to as command signals. Optionally, some or all of the functionality of one or more of the autopilot(s) 125 may be integrated into the second processing system 102 (e.g., integrated into the travel control application 120).

The vehicle management system(s) 124 are configured to be coupled to one or more of the optional one or more other sensors (other sensor(s)) 122, and receive data (e.g., position and/or velocity) from such sensor(s). Using sensor data, e.g., data about the vehicle's position and/or velocity, the vehicle management system 124 issues commands, for altering vehicle velocity, to the second processing system 102 (e.g., the optional travel control application 120) and/or to one or more of the autopilot(s) 125 to attempt to have the vehicle 101 maintain velocity along the intended travel path. Optionally, some or all of the functionality of one or more of the vehicle management systems 124 may be integrated into the first processing system 104 and/or second processing system 102 (e.g., integrated into the travel control application 120 and/or the AHR application 121). Data may be generated by the functionality of the one or more vehicle management systems where such functionality is located.

Optionally, the second processing system 102 (e.g., the second processor circuitry 106 executing the optional travel control application 120) may receive input signals from optional other sensor(s) 122 as is exemplified elsewhere herein. Optionally, the second processing system 102 is configured to receive attitude and heading data, through the interface circuitry 112, from the first processing system 104; optionally, the second processing system 102, (e.g., the travel control application 120 executed by the second processor circuitry 106) is configured to use the attitude and heading data to perform the travel control function.

The first processing system 104 is configured to implement the functions of an attitude and heading reference unit (AHRU). Attitude and heading data may be determined from inertial data and position data using well known equations. For example, the first processor circuitry 109 is configured to execute data, e.g., (a) instructions of the optional AHR application 121, and/or (b) inertial data and/or position data—stored in the first memory circuitry 110. The interface circuitry 112 sends inertial data and/or position data as described above to first processing system 104, e.g., the first processor circuitry 109 and/or the first memory circuitry 110. The first processor circuitry 109 may comprise one or more processor circuits (e.g., an NXP Semiconductor T1014 processor) configured to compute attitude and heading of the vehicle. Optionally, the first processor circuitry 109 has a processing power, e.g., as characterized by mega floating-point operations per second (MFLOPs), that exceeds the processing power of the second processor circuitry 106.

The first memory circuitry 110 is configured to store data generated by and/or processed (e.g., instructions of the optional AHR application 121) by first processor circuitry 109. The first processor circuitry 109 may optionally be configured to send attitude and/or heading data to the second processing system 102 and/or external components, through the interface circuitry 112. Optionally, the second processing system 102, the interface circuitry 112, and the first processing system 104 are enclosed in an enclosure configured to be mounted in or on the vehicle 101. Optionally, the IMU 114 and/or the power supply 116 are enclosed in the enclosure.

In some embodiments, the interface circuitry 112, the second processing system 102, and/or the first processing system 104 may be optionally coupled to one or more optional one or more other sensors (other sensor(s)) 122, one or more vehicle management systems (vehicle management systems(s)) 124, and/or one or more autopilots (autopilot(s)) 125). For pedagogical purposes, FIG. 1 illustrates that the optional other sensor(s) 122, the optional vehicle management system(s) 124, and the optional autopilot(s) 125 are coupled to the first bus interface; however, each of the optional other sensor(s) 122, vehicle management system(s) 124, and autopilot(s) 125, to the extent that they are utilized, may be coupled to the first bus interface 118A, the second bus interface 118B, and/or the third bus interface 118C. Each sensor of the optional other sensor(s) 122, each vehicle management system of the vehicle management system(s) 124, and each autopilot of the autopilot(s) 125 may be coupled, e.g., by a bus or network, to one or more of the bus interfaces. For example, an air data sensor such as a pitot tube, may be coupled to one or more bus interfaces by an ARINC 429 bus.

The other sensor(s) 122 are configured to acquire data about the vehicle 101 (e.g., vehicle position, vehicle speed, vehicle altitude above terrain and/or structure(s), vehicle heading, etc.) and/or about an environmental (e.g., location of terrain and/or structure(s), air pressure, humidity, temperature, particle content, etc.) about the vehicle 101. The other sensor(s) 122 may comprise one or more air data sensors (e.g., pitot tube(s), angle of attack sensor(s), barometric altimeter(s), temperature sensor(s) (e.g., thermistor(s)), and/or any other type of air data sensor(s)), GNSS receiver(s), RADAR(s) (e.g. phased array RADAR(s) and/or RADAR altimeter(s)), LIDAR(s), other imager(s) (e.g., camera(s)), magnetometer(s), particle sensor(s), hygrometer(s), automatic dependent surveillance receiver(s), and/or any other type of sensor(s). Thus, the second processing system 102 and/or the first processing system 104 are optionally configured to receive data from one or more of the optional other sensor(s) 122.

Optionally, the first processing circuitry 104 (e.g., the AHR application 121) is configured to receive and combine data (e.g., vehicle position, vehicle speed, vehicle heading, vehicle altitude, vehicle angle of attack, vehicle altitude above terrain, and/or other data) from one or more of the other sensors(s) 122, e.g., using estimation, to determine attitude and/or heading of the vehicle 101. Optionally, such estimation may use non-linear estimation such as Kalman filter(s) discussed elsewhere herein. Optionally, the estimation is performed on the first processing circuitry 104 (e.g., the AHR application 121).

Optionally, the second processing system 102 is configured to receive data (e.g., vehicle position, vehicle speed, vehicle direction, vehicle altitude, vehicle angle of attack, vehicle altitude above terrain, and/or other data) to verify safety worthiness of commands received by and/or control signals generated by the second processing system 102 (e.g., the travel control application 120). Commands may be received by the second processing system 102 (e.g., the travel control application 120) from one or more of the actuator(s), one or more of the vehicle management system(s) 124, and/or one or more of the autopilot(s) 125. For example, if an air data sensor indicates that the vehicle (e.g., an aircraft) is at risk of stalling due to vehicle speed and/or vehicle angle of attack, then the second processing system 102 will disregard commands and/or will not issue control signals that would have otherwise caused the vehicle 101 to maintain and/or decrease vehicle speed and/or maintain and/or increase vehicle angle of attack so as to cause the vehicle 101 to stall. Also optionally, if one or more of the optional other sensor(s) (e.g., GNSS receiver(s), magnetometer(s), altimeter(s), RADAR(s), LIDAR(s), other imager(s), and/or any other type(s) of sensor) indicate potential imminent collision with structure such as terrain and/or a building, then the second processing system 102 will disregard commands (e.g., from vehicle crew, vehicle management system(s) 124, autopilot(s) 125, and/or other persons and/or systems) and/or not issue control signals that would have otherwise caused the vehicle 101 to collide with the terrain and/or the building.

The foregoing process may be referred to as integrity checking. Integrity checking or integrity means using data from one or more sensor(s) to verify whether command(s) and control signal(s) provided respectively to and from the first processing system (e.g., the travel control application 120) may result a danger to the vehicle 101 such as a crash, loss of control, and/or other undesirable event. If the integrity checking determines that such commands and/or control signals would cause danger to the vehicle, then the commands are disregarded and/or control signals are not issued. Such integrity checking can be used to verify command(s) and/or control signal(s) related vehicle parameter(s), e.g., related to vehicle velocity and position; for example, integrity checking can be performed for maximum speed, minimum speed, maximum angle of attack, maximum angle of descent, maximum altitude, minimum altitude, and/or proximity to terrain, structure(s), and/or other vehicle(s).

Figure 2:
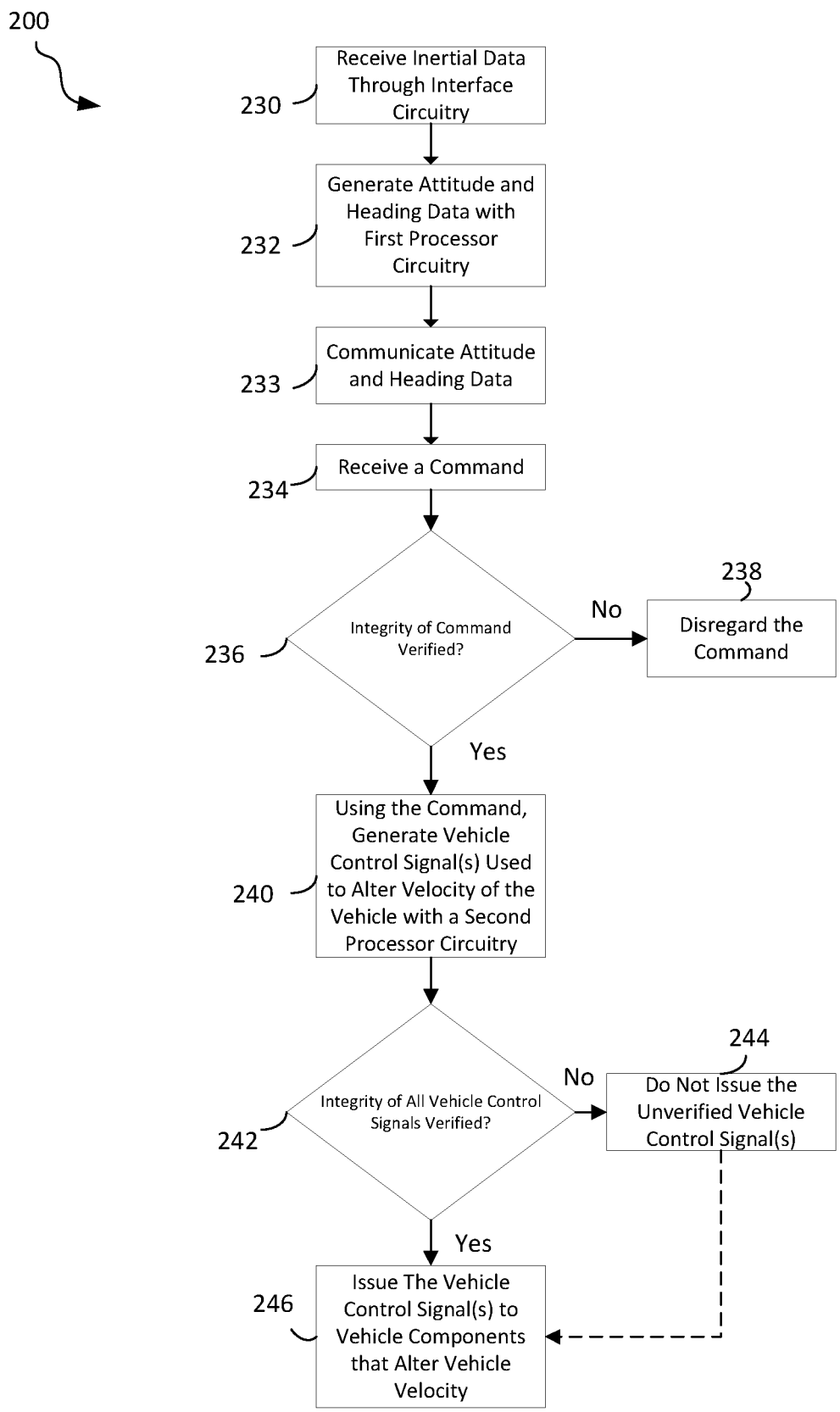
FIG. 2 illustrates a flow diagram of one embodiment of a method for determining attitude and heading data and generating vehicle control signals using interface circuitry.

FIG. 2 illustrates a flow diagram of one embodiment of a method for determining attitude and heading data and generating vehicle control signals using interface circuitry. Method 200 may be implemented using the systems described in FIG. 1, but may be implemented by other means as well. The blocks of the flow diagram have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner).

Method 200 begins at block 230. In block 230, receive inertial data through interface circuitry. For example, the interface circuitry is coupled to first processing circuitry and second processing circuitry. Optionally, the inertial data may be acquired from one or more inertial measurement units through the interface circuitry or other interface(s).

In block 232, using the received inertial data, generate attitude and heading data with the first processing system 104, e.g., with the travel control application. Optionally, the attitude and heading data is estimated with the received inertial data and data received from other sensor(s) 122—as is discussed elsewhere herein. In block 233, communicate the attitude and heading data from the first processing system 104 to the second processing system 102.

Optionally, in block 234, receive a command at the second processing system 102 (e.g., at the travel control application 120), e.g., from at least one of (a) at least one actuator and (b) at least one control system. The command may be received through the interface circuitry 112 or directly by the second processor system 102 through the second bus interface 118B. The at least one control system may be at least one of the control systems described elsewhere herein, and/or one or more of any other control systems. Proceed to block 236 or directly to block 240.

Optionally, in block 236, verify the integrity of the received command using data received from one or more other sensors 122. If the integrity of the command is not verified, proceed to block 238. In block 238, disregard the command that was not verified; that is, do not use the received, but unverified, command to generate one or more control signals in block 240. Optionally, block 236 may be performed in the first processing system 104 and/or the second processing system 102. Optionally, after block 238, return to one of blocks 230, 232, and/or 234. If integrity is verified, proceed to block 240.

In block 240, using at least one of the attitude and heading data and the received and optionally verified command, generate one or more vehicle control signals (vehicle control signal(s)) using the second processing system 102. The vehicle control signal(s) are used by vehicle components to alter velocity of the vehicle. Optionally, second processing circuitry and/or a travel control application are configured to generate the one or more control signals. Optionally, the second processing circuitry is fault tolerant. Optionally, proceed to optional block 242 or directly to block 246.

Optionally, in block 242, verify the integrity of each of the generated one or more vehicle control signals generated in block 240. If the all vehicle control signals are not verified, then in block 244 do not issue the vehicle control signal(s) that are not verified. Thus, some control signal(s) may be verified, and some control signals may not be verified. Optionally after block 244, proceed from block 244 to block 246 to permit verified control signals (if any) to be issued, or (e.g., if there are no verified control signals) return to one of blocks 230, 232, and/or 234.

If integrity of one or more of the control signal(s) are verified, proceed to block 246.

In block 246, issue the one or more vehicle control signals, which optionally have been verified, from the second processing system 102 through the interface circuitry 112 to alter vehicle velocity (e.g., by conveying the one or more control signals from the interface circuitry to one or more vehicle components that alter vehicle velocity). Optionally, then return to blocks 230, 232, and/or 234.

The embodiments of software applications, e.g., the optional travel control application 120 and/or the AHR application 121, can be implemented by computer executable instructions, such as program modules or components, which are executed by at least one processor. Generally, program modules include routines, programs, objects, data components, data structures, algorithms, and the like, which perform particular tasks or implement particular data types.

Instructions for carrying out the various process tasks, calculations, and generation of other data used in the operation of the methods described herein can be implemented in software, firmware, or other computer-readable or processor-readable instructions. These instructions are typically stored on any appropriate computer program product that includes a computer readable medium used for storage of computer readable instructions or data structures.

The circuitry described herein may include any one or combination of processors, microprocessors, digital signal processors, application specific integrated circuits, field programmable gate arrays, and/or other similar variants thereof. The processing circuitry may include or function with software programs, firmware, or other computer readable instructions for carrying out various process tasks, calculations, and control functions, used in the methods described herein. These instructions are typically tangibly embodied on any storage media (or computer readable media) used for storage of computer readable instructions or data structures.

Suitable computer readable media may include storage or memory media such as the memory circuitry illustrated herein. The memory circuitry described herein can be implemented with any available storage media (or computer readable medium) that can be accessed by a general purpose or special purpose computer or processor, or any programmable logic device. Suitable computer readable media may include storage or memory media such as semiconductor, magnetic, and/or optical media, and may be embodied as storing instructions in non-transitory computer readable media, such as random access memory (RAM), read-only memory (ROM), non-volatile RAM, electrically-erasable programmable ROM, flash memory, or other storage media.

EXEMPLARY EMBODIMENTS

Example 1 includes a system, comprising: a first processing system comprising first processor circuitry and configured to determine attitude and heading data of a vehicle using inertial data; a second processing system comprising second processor circuitry and configured to control at least one component of the vehicle using the attitude and heading data, wherein the at least one component is configured to alter a velocity of the vehicle, and wherein the second processor circuitry is fault tolerant; and interface circuitry communicatively coupled between the first processing system and the second processing system, wherein the interface circuitry is configured to receive the inertial data, to provide the inertial data to the first processing system, and to provide the attitude and heading data to the second processing system, and wherein the interface circuitry comprises an interface to at least one of (a) at least one bus and (b) at least one network shared by the first processing system and the second processing system.

Example 2 includes the system of Example 1, further comprising a power supply coupled to the first processing system, the second processing system, and the interface circuitry.

Example 3 includes the system of any of Examples 1-2, further comprising an inertial measurement unit, wherein the inertial measurement unit is coupled to the interface circuitry.

Example 4 includes the system of any of Examples 1-3, further comprising: at least one other sensor coupled to the interface circuitry; wherein the first processor circuitry is configured to estimate an attitude and heading of the vehicle using the inertial data and data from the at least one other sensor.

Example 5 includes the system of any of Examples 1-4, wherein the first processor circuitry has a processing power that is greater than a processing power of the second processor circuitry.

Example 6 includes the system of any of Examples 1-5, wherein the interface circuitry is configured to be coupled to at least one of: (a) one or more vehicle management systems, (b) one or more autopilots, and (c) at least one actuator.

Example 7 includes the system of Example 6, further comprising: at least one other sensor coupled to the interface circuitry; wherein the second processor circuitry is configured to receive data from the at least one other sensor, and to perform an integrity check, using the data, on at least one of: (a) control signals issued by the first processor circuitry and (b) a command signal received from at least one of the (i) the one or more vehicle management systems, (ii) the one or more autopilots, and (iii) the at least one actuator.

Example 8 includes a method comprising: receiving inertial data at first processing circuitry through interface circuitry, where the interface circuitry communicatively couples the first processing circuitry to second processing circuitry; using the received inertial data, generating attitude and heading data using the first processing circuitry; communicating the generated attitude and heading data to the second processing circuitry through the interface circuitry; receiving a command signal; using at least one of the generated attitude and heading data and the received command signal, generating one or more vehicle control signals to alter vehicle velocity using the second processing circuitry; and issuing the one or more vehicle control signals from the second processing circuitry through the interface circuitry to alter vehicle velocity.

Example 9 includes the method of Example 8, wherein the second processing circuitry is fault tolerant.

Example 10 includes the method of any of Examples 8-9, further comprising: upon receiving the command signal, verifying integrity of the command signal using data received from one or more other sensors coupled to the interface circuitry; and disregarding a command signal that is not verified so that the one or more vehicle control signals are not generated by the second processing circuitry in response to the command signal.

Example 11 includes the method of any of Examples 8-10, further comprising: upon generating one or more vehicle control signals, verifying the integrity of the one or more vehicle control signals using data received from one or more other sensors coupled to the interface circuitry; and disregarding at least one vehicle control signal that is not verified so that the unverified vehicle control signal is not issued from the second processing circuitry.

Example 12 includes the method of any of Examples 8-11, wherein using the received inertial data, generating the attitude and heading data using the first processing circuitry further comprises estimating the attitude and heading data using the received inertial data and data from other sensors coupled to the interface circuitry.

Example 13 includes a system, comprising: first processing circuitry configured to determine attitude and heading data of a vehicle using inertial data; second processing circuitry configured to control at least one component of the vehicle using attitude and heading data and at least one command signal, wherein the at least one component is configured to alter a velocity of the vehicle; and interface circuitry communicatively coupled between the first processing circuitry and the second processing circuitry, wherein the interface circuitry is configured to receive the inertial data, to provide the inertial data to the first processing circuitry, and to provide the attitude and heading data to the second processing circuitry, and wherein the interface circuitry comprises an interface to at least one of (a) at least one bus and (b) at least one network shared by the first processing circuitry and the second processing circuitry.

Example 14 includes the system of Example 13, wherein the second processing circuitry is fault tolerant.

Example 15 includes the system of any of Examples 13-14, further comprising a power supply coupled to the first processing circuitry, the second processing circuitry, and the interface circuitry.

Example 16 includes the system of any of Examples 13-15, further comprising an inertial measurement unit, wherein the inertial measurement unit is coupled to the interface circuitry.

Example 17 includes the system of any of Examples 13-16, further comprising: at least one other sensor coupled to the interface circuitry; wherein the first processing circuitry is configured to estimate an attitude and heading of the vehicle using the inertial data and data from the at least one other sensor.

Example 18 includes the system of any of Examples 13-17, wherein the first processing circuitry has a processing power that is greater than a processing power of the second processing circuitry.

Example 19 includes the system of any of Examples 13-18, wherein the interface circuitry is configured to be coupled to: (a) one or more vehicle management systems, (b) one or more autopilots coupled to the interface circuitry, and (c) at least one actuator.

Example 20 includes the system of Example 19, further comprising: at least one other sensor coupled to the interface circuitry; wherein the second processing circuitry is configured to receive data from the at least one other sensor, and to perform an integrity check, using the data, on at least one of: (a) control signals issued by the first processing circuitry and (b) a command signal received from at least one of the (i) the one or more vehicle management systems, (ii) the one or more autopilots, and (iii) the at least one actuator.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A system, comprising:
a first processing system comprising first processor circuitry and configured to determine attitude and heading data of a vehicle using inertial data;
a second processing system comprising second processor circuitry and configured to issue one or more vehicle control signals to control at least one component of the vehicle using the attitude and heading data, wherein the at least one component is configured to alter a velocity of the vehicle, and wherein the second processor circuitry is fault tolerant; and
an interface circuit communicatively coupled between the first processing system and the second processing system, wherein the interface circuit is configured to receive the inertial data, to provide the inertial data to the first processing system, to provide the attitude and heading data to the second processing system, and to receive the issued one or more vehicle control signals from the second processing system, and wherein the interface circuit comprises an interface to at least one of (a) at least one bus and (b) at least one network shared by the first processing system and the second processing system.

2. The system of claim 1, further comprising a power supply coupled to the first processing system, the second processing system, and the interface circuit.

3. The system of claim 1, further comprising an inertial measurement unit, wherein the inertial measurement unit is coupled to the interface circuit.

4. The system of claim 1, further comprising:
at least one other sensor coupled to the interface circuit;
wherein the first processor circuitry is configured to estimate an attitude and heading of the vehicle using the inertial data and data from the at least one other sensor.

5. The system of claim 1, wherein the first processor circuitry has a processing power that is greater than a processing power of the second processor circuitry.

6. The system of claim 1, wherein the interface circuit is configured to be coupled to at least one of: (a) one or more vehicle management systems, (b) one or more autopilots, and (c) at least one actuator.

7. The system of claim 6, further comprising:
at least one other sensor coupled to the interface circuit;
wherein the second processor circuitry is configured to receive data from the at least one other sensor, and to perform an integrity check, using the data, on at least one of: (a) the one or more vehicle control signals and (b) a command signal received from at least one of the (i) the one or more vehicle management systems, (ii) the one or more autopilots, and (iii) the at least one actuator.

8. A method comprising:
receiving inertial data at first processing circuitry through an interface circuit, where the interface circuit communicatively couples the first processing circuitry to second processing circuitry;
using the received inertial data, generating attitude and heading data using the first processing circuitry;
communicating the generated attitude and heading data to the second processing circuitry through the interface circuit;
receiving a command signal at the second processing circuitry;
using at least one of the generated attitude and heading data and the received command signal, generating one or more vehicle control signals to alter vehicle velocity using the second processing circuitry; and
issuing the one or more vehicle control signals from the second processing circuitry through the interface circuit to alter vehicle velocity.

9. The method of claim 8, wherein the second processing circuitry is fault tolerant.

10. The method of claim 8, further comprising:
upon receiving the command signal, verifying integrity of the command signal using data received from one or more other sensors coupled to the interface circuit; and
disregarding a command signal that is not verified so that the one or more vehicle control signals are not generated by the second processing circuitry in response to the command signal.

11. The method of claim 8, further comprising:
upon generating one or more vehicle control signals, verifying an integrity of the one or more vehicle control signals using data received from one or more other sensors coupled to the interface circuit; and
disregarding at least one vehicle control signal that is not verified so that the unverified vehicle control signal is not issued from the second processing circuitry.

12. The method of claim 8, wherein using the received inertial data, generating the attitude and heading data using the first processing circuitry further comprises estimating the attitude and heading data using the received inertial data and data from other sensors coupled to the interface circuit.

13. A system, comprising:
first processing circuitry configured to determine attitude and heading data of a vehicle using inertial data;
second processing circuitry configured to issue one or more vehicle control signals to control at least one component of the vehicle using the attitude and heading data, and to receive at least one command signal, wherein the at least one component is configured to alter a velocity of the vehicle; and
an interface circuit communicatively coupled between the first processing circuitry and the second processing circuitry, wherein the interface circuit is configured to receive the inertial data, to provide the inertial data to the first processing circuitry, to provide the attitude and heading data to the second processing circuitry, and to receive the issued one or more vehicle control signals from the second processing circuitry, and wherein the interface circuit comprises an interface to at least one of (a) at least one bus and (b) at least one network shared by the first processing circuitry and the second processing circuitry.

14. The system of claim 13, wherein the second processing circuitry is fault tolerant.

15. The system of claim 13, further comprising a power supply coupled to the first processing circuitry, second processing circuitry, and interface circuit.

16. The system of claim 13, further comprising an inertial measurement unit, wherein the inertial measurement unit is coupled to the interface circuit.

17. The system of claim 13, further comprising:
at least one other sensor coupled to the interface circuit;
wherein the first processing circuitry is configured to estimate an attitude and heading of the vehicle using the inertial data and data from the at least one other sensor.

18. The system of claim 13, wherein the first processing circuitry has a processing power that is greater than a processing power of the second processing circuitry.

19. The system of claim 13, wherein the interface circuit is configured to be coupled to: (a) one or more vehicle management systems, (b) one or more autopilots coupled to the interface circuit, and (c) at least one actuator.

20. The system of claim 19, further comprising:
at least one other sensor coupled to the interface circuit;
wherein the second processing circuitry is configured to receive data from the at least one other sensor, and to perform an integrity check, using the data, on at least one of: (a) the one or more vehicle control signals and (b) a command signal received from at least one of the (i) the one or more vehicle management systems, (ii) the one or more autopilots, and (iii) the at least one actuator.

* * * * *